United States Patent [19]
Kolak

[11] Patent Number: 5,493,303
[45] Date of Patent: Feb. 20, 1996

[54] MONOPULSE TRANSCEIVER

[75] Inventor: Frank S. Kolak, Billerica, Mass.

[73] Assignee: M/A-Com, Inc., Lowell, Mass.

[21] Appl. No.: 273,833

[22] Filed: Jul. 12, 1994

[51] Int. Cl.[6] .................................. G01S 13/44
[52] U.S. Cl. ..................... 342/153; 342/149; 342/152; 455/327; 343/700 MS
[58] Field of Search .................. 342/149, 152, 342/153, 80, 427; 455/327; 343/700 MS

[56] References Cited

U.S. PATENT DOCUMENTS

| | | |
|---|---|---|
| 4,063,245 | 12/1977 | James et al. |
| 4,173,019 | 10/1979 | Williams. |
| 4,318,107 | 3/1982 | Pierrot et al. .................. 343/700 MS |
| 4,686,535 | 8/1987 | Lalezari. |
| 4,899,163 | 2/1990 | Daniel et al. |
| 4,914,445 | 4/1990 | Shoemaker. |
| 4,980,925 | 12/1990 | Blustine et al. .................. 455/327 |
| 5,017,931 | 5/1991 | Carlyon. |
| 5,201,065 | 4/1993 | Niehenke .................. 455/327 |

*Primary Examiner*—Ian J. Lobo
*Attorney, Agent, or Firm*—St. Onge Steward Johnston & Reens

[57] ABSTRACT

A dual channel monopulse transceiver is described for use at millimeter wavelengths and for the detection of targets for vehicle collision avoidance. A microstrip antenna is located on one side of a plate and a transceiver microstrip circuit coupled to the antenna is located on the other side of the plate. The transceiver includes a reflective balanced mixer, an isolated balanced mixer and a hybrid circuit for connecting the mixers to antenna feed points. Sum and difference signal generating circuits are employed to provide single and split antenna beams for the detection of targets.

5 Claims, 3 Drawing Sheets

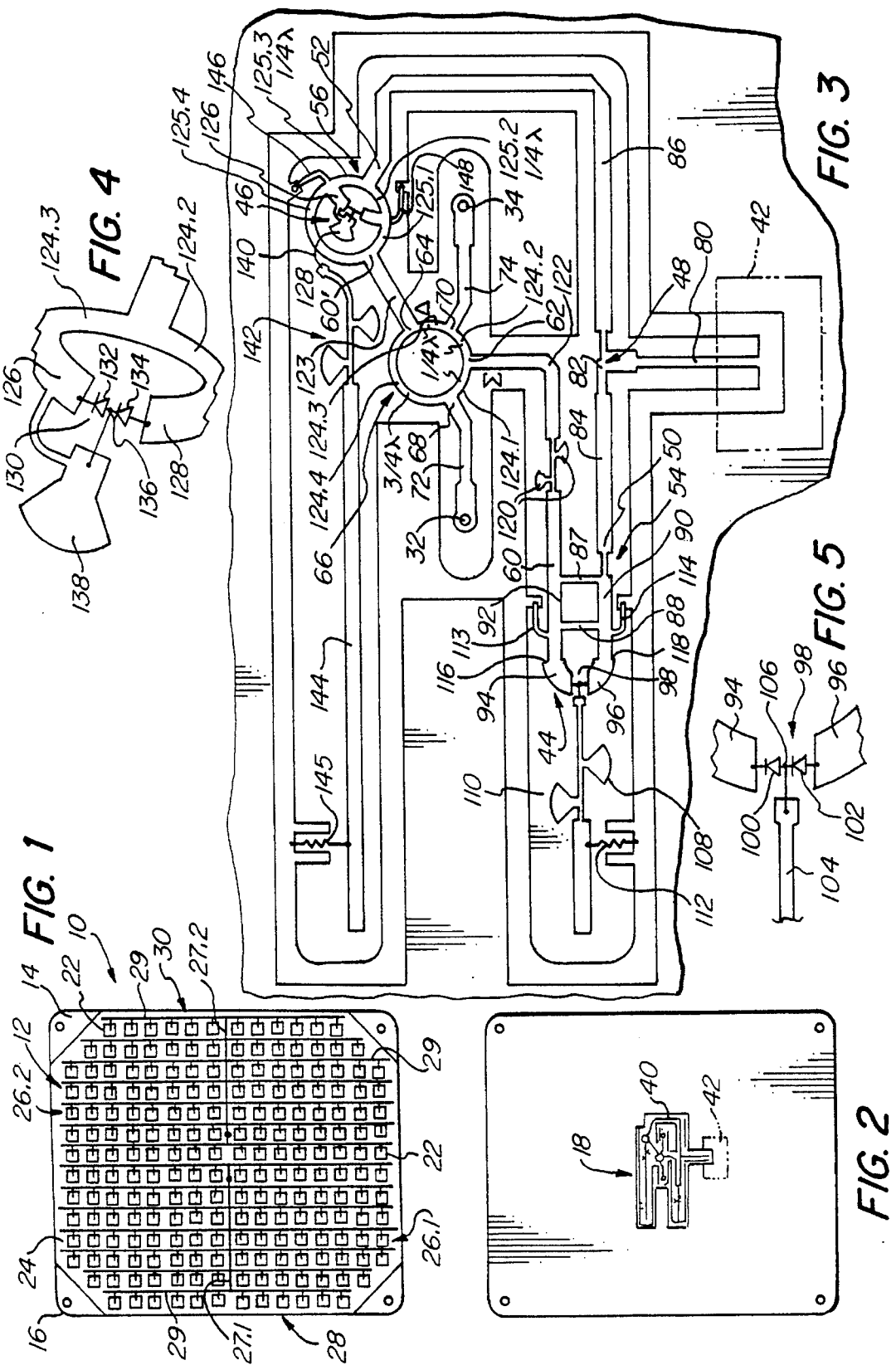

MONOPULSE TRANSCEIVER

FIELD OF THE INVENTION

This invention generally relates to a monopulse transceiver and more particularly to such transceivers for use in a vehicle collision avoidance system.

BACKGROUND OF THE INVENTION

Monopulse receivers are known in the art. Typically these are used in radar systems in which a continuous rf signal is generated and a reflected return from a moving target is detected within the antenna mixer, oscillator radar system. The monopulse antenna receiver obtains a sense of directivity for the target.

When a monopulse transceiver is needed at high frequencies such as of the order of 24 gigahertz high efficiency and low losses are needed to provide an effective low noise receiver.

In a copending patent application entitled, "Microstrip Antenna" and filed in the U.S. Patent Office as of Jun. 29, 1994 bearing Ser. No. 08/267,586 and assigned to the same assignee, a high efficiency antenna is described which is particularly effective in a radar vehicle collision avoidance system.

With a dual channel monopulse receiver in accordance with the invention, a low loss receiver is obtained that can be particularly effective for use in a vehicle collision avoidance system operating at very high frequencies of the order of 24 gigahertz.

This is achieved by employing in one form of the invention a planar microstrip antenna of the type as described in the aforementioned copending patent application. In such antenna, a main array is broken in two parts to create a left- and right-located arrays of patch-radiating elements. These are located on a substrate placed on one side of and connected by lattices of traces on the substrate. The respective lattices are connected to feed points which extend through the antenna plate to a substantially planar microstrip transceiver circuit located on the other opposite side of the plate.

The microstrip circuit includes an rf oscillator, a pair of microstrip rf mixers a reactive divider and a 180° microstrip hybrid coupler connected between the antenna feedpoints and the rf mixers. RF power from the oscillator is efficiently coupled in a balanced manner to the respective antenna arrays and return signals are efficiently coupled from the arrays to the respective rf mixers with a microstrip sum and difference signal generator. This produces an amplitude sum of the rf return signals which is coupled to a sum channel rf mixer and also produces an amplitude difference of the return signals which is coupled to a difference channel rf mixer. The oscillator signal is applied to each of the respective mixers for combination with the respective sum and difference signals to produce sum and difference outputs which are also representative of doppler variations in the returns.

The hybrid mixer associated with the difference channel provides a large amount of isolation between the antenna and to the oscillator, of the order of 25 db, so that little oscillator signal can be coupled to the left and right antenna arrays via the difference channel path. As a result, during transmission only an in-phase oscillator signal is applied to both left and right arrays. The combined effect is a sharper beam during transmission while during reception, the difference signal generation results in a pair of closely-spaced split beams. The split beams and the single center beam from the effect of the sum channel can together yield directional information of a target.

With a transceiver/receiver in accordance with the invention the antenna produces beams, which can thus be used to derive, in addition to the presence of a target, an indication of its direction relative to the path of a vehicle on which the antenna is mounted. The receiver exhibits a high efficiency, excellent resolution and low losses for good target detection capability.

It is, therefore, an object of the invention to provide a microstrip transceiver capable of operating at millimeter wavelengths for use in the detection and direction of targets for vehicle collision avoidance. It is a further object of the invention to provide a directional millimeter wavelength antenna and microstrip transceiver using a planar array of patch elements and which exhibits low losses, a high efficiency and is economic to manufacture.

These and other objects and advantages of the invention can be understood from the following detailed description of an embodiment in accordance with the invention as illustrated in the drawings.

BRIEF DESCRIPTION OF THE DRAWINGS

FIG. 1 is a plan front view of a microstrip antenna used with the microstrip transceiver of this invention;

FIG. 2 is a plan rear view of the transceiver in accordance with the invention;

FIG. 3 is an enlarged plan view of the rear of the transceiver of this invention;

FIG. 4 is an enlarged plan view of a difference channel mixer used in the microstrip transceiver of FIG. 3;

FIG. 5 is an enlarged plan view of a diodes used in sum channel mixer used in the microstrip transceiver of FIG. 3;

DETAILED DESCRIPTION OF THE DRAWINGS

Figure 6:
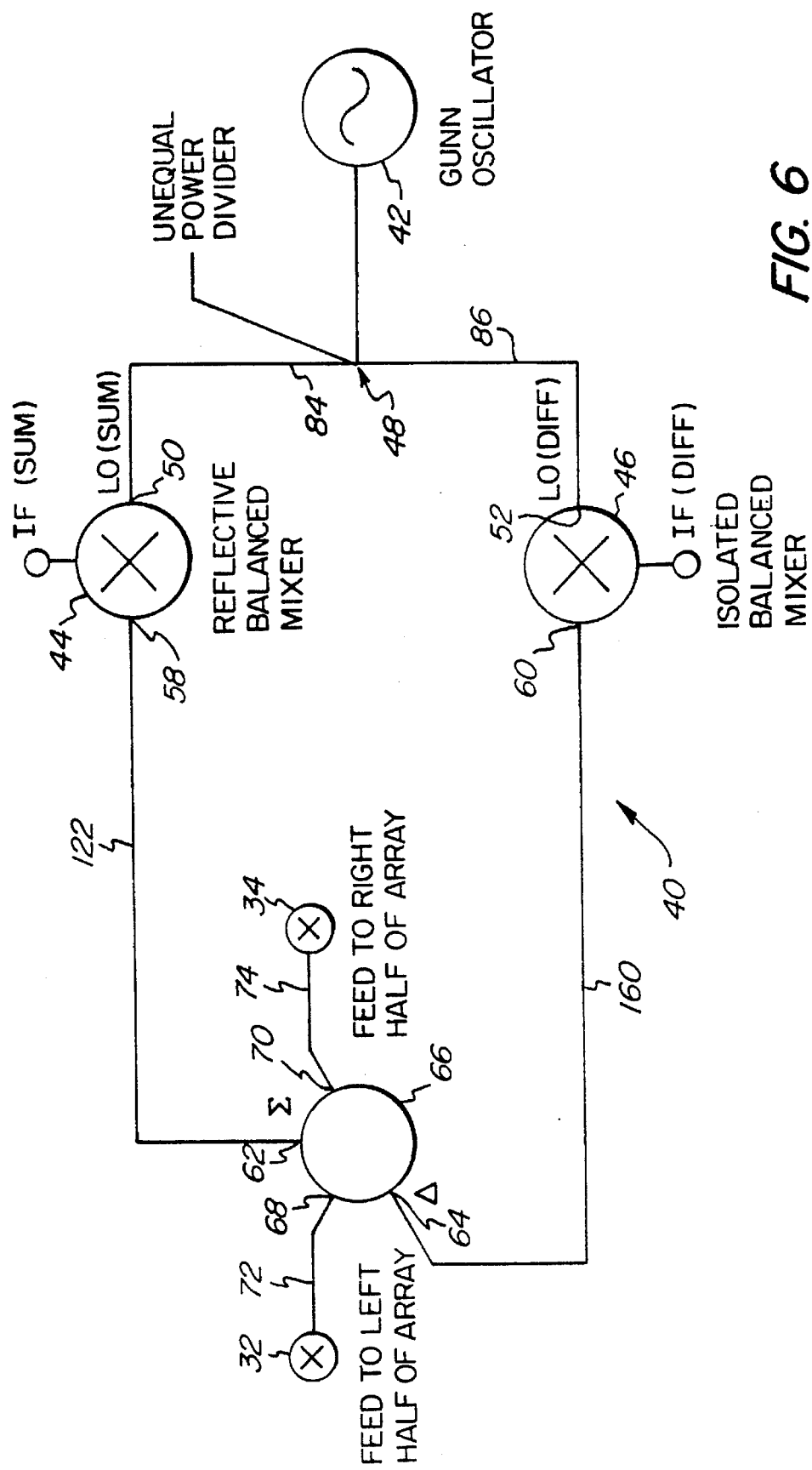
FIG. 6 is a schematic representation of the transceiver of this invention.

With reference to FIGS. 1 through 5 a microstrip transceiver 10 is shown formed with a microstrip antenna 12 on one side 14 of a metal plate 16 and a microstrip transmitter/receiver circuit 18 located on the other side 20 of the plate 16. The microstrip antenna 12 can be formed of various configurations, but preferably is of the type as described in the aforementioned Microstrip Antenna patent application, the full scope of which and any patent as may issue therefrom is incorporated herewith by reference thereto.

The antenna 12 is of the planar microstrip type wherein a plurality of flat rectangular patch elements 22 are deposited onto a substrate 24 and are interconnected by lattices 26.1 and 26.2 of conductor traces. The lattices include main lines 27.1 and 27.2 and branch lines 29. The patch elements are 22 are arranged in rows and columns and form two like antenna arrays 28, 30 connected by feed points 32, 34 respectively to the rear located microstrip transmitter/receiver 18. The patch elements 22 are so spaced from each other as to be fed in phase and the locations of the feed points 32, 34 are so selected as to provide a desired power distribution desired to achieve narrow antenna beams.

Appropriate impedance transformers are employed in the main and branch lines 27, 29 of the lattices 26 to assure low losses and a high antenna efficiency all as described in the aforementioned copending patent application.

The transmitter/receiver circuit 18 includes, as shown in FIG. 6, a microstrip circuit 40 which connects an oscillator 42 to mixers 44, 46 and to the antenna feedpoints 32, 34. A microstrip unequal power divider 48 couples the oscillator 42 to local oscillator ports 50, 52 of balanced mixers 44, 46. Oscillator power is effectively prevented from coupling through the difference channel hybrid mixer coupler 46 because of its high isolation effect. A portion of local oscillator power is permitted to couple directly through the hybrid and mixer network 44 to antenna port 58 and then to port 62 of a hybrid ring coupler 66. Coupler 66 has ports 68, 70 connected to feedpoints 32, 34 via microstrip lines 72, 74 respectively.

With further reference to FIGS. 3, 4, and 5, the microstrip circuit 40 is formed with a microstrip line 80 coupling the oscillator 42 to power divider 48. This is selected by controlling the width of the microstrip lines on both sides of the junction 82 to provide a greater amount of power along microstrip line 84 than along microstrip line 86. Line 84 is connected to input port 50 of the sum channel hybrid circuit 54. A finite amount of oscillator power is permitted to pass through the hybrid 54 to be radiated by both left- and right-side antenna arrays. The hybrid coupler 54 includes power dividers 87, 88, each a quarter wavelength long and separated by quarter wavelength lines 90, 92. Wavelength as used herein refers to the wavelength $\lambda g$ as affected by the substrate.

The mixer 44 is formed between a pair of widened curved, ¼ $\lambda g$, microstrip lines 94, 96 which terminate at a gap 98 in which a pair of series-connected high frequency diodes 100, 102 are placed and connected as illustrated in FIG. 5. A low frequency doppler output is obtained on a line 104 which is connected to junction 106 between diodes 100, 102. The line 104 is connected to low-pass filters 108, 110 and a resistor 112 parallels doppler output 106 to ground. The low frequency doppler output from the sum channel mixer 44 is then made available at a suitable pin for further signal processing. DC return lines 113, 114 respectively connect mixer segments 94, 96 to ground.

The hybrid coupler 54 is of the reflective type with which millimeter wavelength signal from the oscillator 42 is reflected by abrupt transitions 116, 118 and the reflected signal is then coupled to the antenna ports 32, 34. A second harmonic rejection filter 120 connects port 60 to microstrip line 122 which couples rf power to the hybrid ring 54 and port 62 of antenna hybrid coupler 66.

Hybrid 66 is a ring-shaped microstrip coupler whose dimensions are selected so as to produce an amplitude sum rf signal on port 62 and an amplitude difference rf signal on port 64. This is obtained by controlling the lengths of microstrip ring segments 124 between the ports. Thus ring segments 124.1, 124.2 and 124.3 are all made a quarter wavelength long and ring segments 124.4 is three-quarters wavelength long.

The ring hybrid coupler port 64 is connected by a microstrip line 123 to port 60' of 180° hybrid ring mixer 56. This has ring segments 125.1, three-quarters wavelength long, and ring segment 125.2, 125.3 and 125.4, each of which is a quarter wavelength long. A pair of mixer line segments 126 and 128 extend inwardly from the ring coupler towards each other while leaving a gap 130 between them.

A pair of series-connected diodes 132, 134 are connected across the gap 130 and their junction 136 is connected to an output terminal 138. This in turn is coupled by a jumper 140 to a low-pass filter 142 to doppler output line 144. A resister 145 connects line 144 in parallel to ground while return microstrip lines 146, 148 connect the segments 126, 128 to ground.

Transmission of power from the oscillator 42 occurs with low losses via microstrip lines 84, 86. Power reflected by transitions 116, 118 arrives at ports 68, 70 leading to feedpoints 32, 34.

Figure 7:
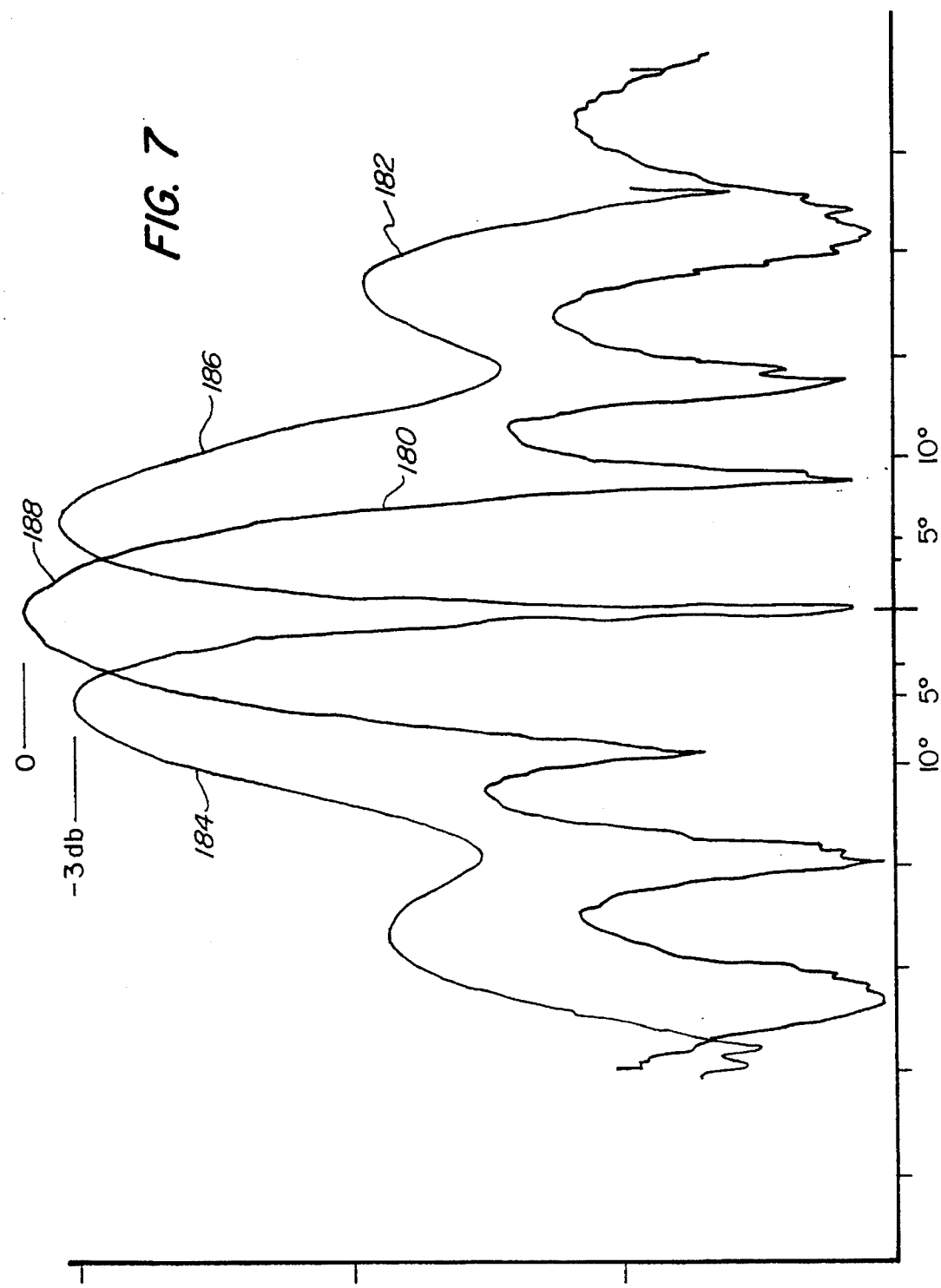
FIG. 7 is plot of antenna patterns obtained with a microstrip antenna and transceiver in accordance with the invention.

FIG. 7 illustrates the beam pattern achieved with the dual channel receiver 10 of this invention. Plot 180 is the pattern for the summing channel and plot 182 is for the difference channel. Both patterns overlap so that subsequent signal processing can both detect a target and derive its approximate direction. The difference channel pattern produces closely-spaced, split beams 184, 186 while the sum channel has a single beam 188 positioned between beams 184, 186. During transmission a single central, narrow beam like 188 is obtained. Beams 184, 186 have approximately each twice the 3 db beamwidths of the single beam 188.

Having thus described a preferred embodiment of the invention, its advantages can be appreciated. Variations of the embodiment can be made without departing from the scope of the invention.

What is claimed is:

1. A dual channel monopulse transceiver, comprising:

a metal plate having a substrate on a side thereof;

a planar microstrip antenna formed of a plurality of patch elements placed on said substrate and arranged along rows and columns;

connecting conductive traces on said substrate and coupled between first and second feed points and the patch elements so as to form first and second arrays of patch elements on said substrate, said arrays being located alongside each other and respectively coupled to said feed points; said feed points extending through said plate to an opposite side thereof;

a microstrip transceiver located on said other side of the plate, said transceiver circuit including a microstrip difference channel mixer, a microstrip sum channel mixer, an oscillator and a microstrip circuit interconnecting said mixers, oscillator, and feed points;

said microstrip circuit including:

a first hybrid having a sum channel output coupled to the sum channel mixer, an oscillator input coupled to the oscillator, and an rf output;

a second hybrid having a difference channel output coupled to the difference channel mixer, an oscillator input coupled to the oscillator, and an rf output; and an rf sum-and-difference signals-generating hybrid having first and second rf ports coupled to the first and second feed points respectively and having a second pair of ports coupled to the rf outputs of the first and second hybrids to provide rf sum-and-difference signals respectively thereto.

2. The dual channel monopulse transceiver as claimed in claim 1 wherein said sum channel mixer and first hybrid form a reflective balanced mixer.

3. The dual channel monopulse transceiver as claimed in claim 1 wherein said difference channel mixer and said second hybrid form an isolated balanced mixer.

4. The dual channel monopulse transceiver as claimed in claim 1 wherein said microstrip circuit includes a power divider interposed between said oscillator and said oscillator inputs of the first and second hybrid mixers.

5. The dual channel monopulse transceiver as claimed in claim 4 wherein said power divider is unequal and supplies more power to the first hybrid than to the second hybrid.

* * * * *